United States Patent
Carter et al.

(10) Patent No.: US 12,497,077 B2
(45) Date of Patent: Dec. 16, 2025

(54) INTERPRETABLE KALMAN FILTER COMPRISING NEURAL NETWORK COMPONENT(S) FOR AUTONOMOUS VEHICLES

(71) Applicant: Zoox, Inc., Foster City, CA (US)

(72) Inventors: John Bryan Carter, Upton, MA (US);
Francesco Papi, Oakland, CA (US);
Qian Song, San Mateo, CA (US);
Zachary Sun, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 519 days.

(21) Appl. No.: 17/896,778

(22) Filed: Aug. 26, 2022

(65) Prior Publication Data

US 2024/0092397 A1    Mar. 21, 2024

(51) Int. Cl.
*B60W 60/00*    (2020.01)
*B60W 50/00*    (2006.01)
(Continued)

(52) U.S. Cl.
CPC .... *B60W 60/0027* (2020.02); *B60W 50/0097* (2013.01); *G05B 13/027* (2013.01);
(Continued)

(58) Field of Classification Search
CPC .. B60W 40/00; B60W 40/12; B60W 50/0097; B60W 60/0027;
(Continued)

(56) References Cited

U.S. PATENT DOCUMENTS

2018/0356492 A1* 12/2018 Hamilton ................ G01S 13/76
2019/0258251 A1*  8/2019 Ditty .................... G06F 15/7807
(Continued)

FOREIGN PATENT DOCUMENTS

| CN | 112651456 A | 4/2021 |
|---|---|---|
| CN | 112758097 A | 5/2021 |
| CN | 114084129 A | 2/2022 |

OTHER PUBLICATIONS

Revach et al., "KalmanNet: Neural Network Aided Kalman Filtering for Partially Known Dynamics," Partially Presented at the IEEE International Conference on Acoustics, Speech, and Signal Processing (ICASSP) 2021; Last Revised Mar. 11, 2022 (v3); Retrieved Online From arXiv at Cornell University with Document ID arXiv:2107.10043 at <<<https://arxiv.org/abs/2107.10043>>>; Later Published in IEEE Transactions on Signal Processing, vol. 70, pp. 1532-1547, Published Online May 16, 2022, Available at <<<https://ieeexplore.ieee.org/document/9733186>>>.
(Continued)

*Primary Examiner* — Angela Y Ortiz
*Assistant Examiner* — Aaron K Mccullers
(74) *Attorney, Agent, or Firm* — Lee & Hayes, P.C.

(57) ABSTRACT

A modified Kalman filter may include one or more neural networks to augment or replace components of the Kalman filter in such a way that the human interpretability of the filter's inner functions is preserved. The neural networks may include a neural network to account for bias in measurement data, a neural network to account for unknown controls in predicting a state of an object, a neural network ensemble that is trained differently based on different sensor data, a neural network for determining the Kalman gain, and/or a set of Kalman filters including various neural networks that determine independent estimated states, which may be fused using Bayesian fusion to determine a final estimated state.

18 Claims, 7 Drawing Sheets

(51) Int. Cl.
*G05B 13/02* (2006.01)
*G06N 3/045* (2023.01)
*H03H 17/02* (2006.01)

(52) U.S. Cl.
CPC ......... *G06N 3/045* (2023.01); *H03H 17/0257* (2013.01); *B60W 2050/0022* (2013.01); *B60W 2050/0028* (2013.01); *B60W 2050/0052* (2013.01); *B60W 2554/404* (2020.02)

(58) Field of Classification Search
CPC ..... B60W 60/00272; B60W 60/00274; B60W 2050/0022; B60W 2050/0024; B60W 2050/0025; B60W 2050/0028; B60W 2050/0037; B60W 2050/0052; B60W 2554/404; G05B 13/0265; G05B 13/027; G05B 13/0285; G05B 13/029; G05B 13/04; G06N 3/02; G06N 3/045; G06N 3/0455; G06N 3/09; G06V 10/82; G06V 20/56; H03H 17/0257
USPC ............. 701/27, 59, 98, 479, 480, 481, 524; 706/23, 28, 29
See application file for complete search history.

(56) References Cited

U.S. PATENT DOCUMENTS

| | | | |
|---|---|---|---|
| 2019/0278282 A1* | 9/2019 | Palanisamy | G05D 1/0221 |
| 2020/0148201 A1 | 5/2020 | King et al. | |
| 2020/0372285 A1* | 11/2020 | Adams | G06V 20/582 |
| 2022/0032709 A1 | 2/2022 | Lee et al. | |
| 2022/0107184 A1* | 4/2022 | Omr | G06N 3/0464 |
| 2022/0326394 A1* | 10/2022 | Berntorp | G01S 19/44 |
| 2022/0366703 A1* | 11/2022 | Sheng | G06T 7/277 |
| 2023/0001940 A1* | 1/2023 | Doerr | G06N 3/094 |
| 2023/0237783 A1* | 7/2023 | Banerjee | G01S 17/86 382/103 |

OTHER PUBLICATIONS

The International Preliminary Report on Patentability mailed Mar. 13, 2025 for PCT Application No. PCT/US23/29551, 6 pages.

* cited by examiner

INTERPRETABLE KALMAN FILTER COMPRISING NEURAL NETWORK COMPONENT(S) FOR AUTONOMOUS VEHICLES

BACKGROUND

Autonomous vehicles may use sensors to capture data regarding an environment through which the autonomous vehicles traverse. Autonomous vehicles use this sensor data to detect objects in the environment to avoid collisions. However, sensors are not perfectly accurate and/or precise all the time and may even output large measurement errors, at times, which can put systems that rely on the sensors at risk. Moreover, methods of dealing with such errors may reduce or eliminate the ability to preserve the human interpretability of such methods.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
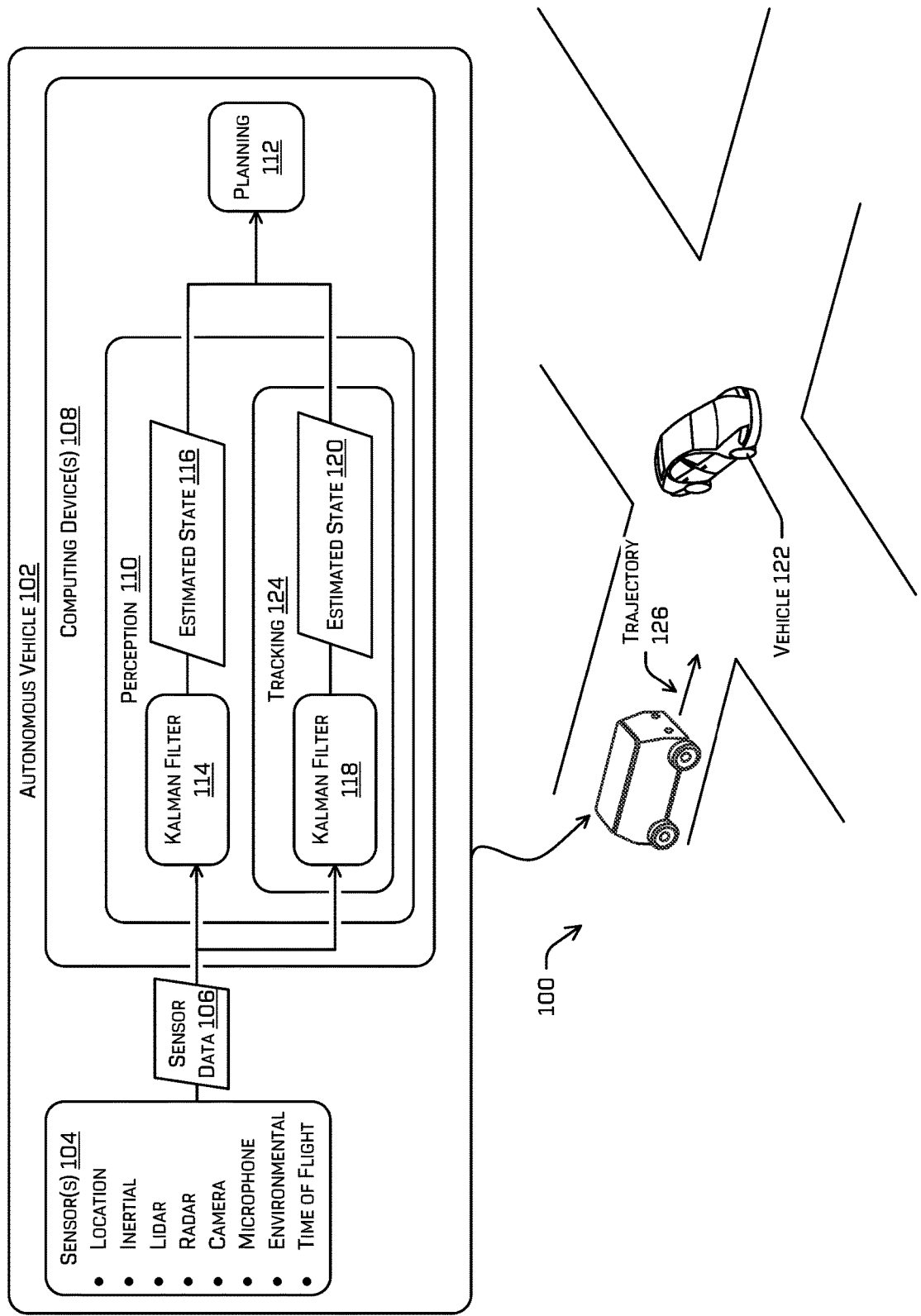
FIG. 1 illustrates an example scenario in which an autonomous vehicle uses two Kalman filters with interpretable components that improve the Kalman filters' operations for different operations on the vehicle. A first Kalman filter may use the techniques discussed herein to determine an estimated speed of the autonomous vehicle and a second Kalman filter may determine an estimated object position and/or velocity.

As discussed above, sensors may not always perform perfectly, due to limitations of sensor design, environmental interferences (e.g., cloud cover, solar glare, humid conditions, seismic activity), and/or adverse sensor conditions, such as overheating, broken parts, wear and tear, or the like. At times, errors in sensor output may be extreme enough to negatively impact systems that rely thereon, such as an autonomous vehicle, which may include systems that use sensor data to determine what is in the environment surrounding the autonomous vehicle and how to navigate. This application relates to techniques for minimizing the impact of such errors. Examples described herein apply to Kalman filters, in particular.

A Kalman filter is a hardware and/or software system that can account for bounds of a sensor's ability to measure noise from the sensor and/or other variables in determining an estimated state based on a measurement output by the sensor. For example, the sensor could be a wheel speed sensor, which outputs a value indicative of a number of times a vehicle wheel has turned within a time period. The number of times measured may have an error associated with it due to inaccuracies and/or limitations of the wheel speed sensor, noise (e.g., various interference in the environment and/or in the sensor), etc. A Kalman filter can be designed to estimate an uncertainty associated with the measurement and use that estimated uncertainty to account for potential errors in the measurement. The Kalman filter then can determine an estimated state using the uncertainty, which may functionally result in an estimated state that is slightly different than the measurement would indicate. Returning to the wheel speed sensor example, the measurement might indicate a certain number of revolutions and it would be expected that the certain number of revolutions would result in a vehicle speed of 10 miles per hour, for example, but the Kalman filter's estimate of the vehicle speed may be 9.8 miles per hour after accounting for the uncertainty associated with the measurement.

A Kalman filter's estimate of the uncertainty associated with a measurement can be based on predicting a next state of the system and determining how good the prediction was using a next measurement once it is received. For controlled systems, such as a wheel that is being controlled by an autonomous vehicle system, the Kalman filter may factor in the controls. Although, in some examples, the control instructions for controlling the autonomous vehicle system may be unavailable or corrupted, which may degrade the accuracy of the Kalman filter. Returning to the wheel encoder example, the Kalman filter may predict a vehicle speed at a next time step (e.g., 0.1 seconds in the future, 0.2 seconds in the future, 0.5 seconds in the future, 1 second in the future), based on the current uncertainties associated with the currently estimated vehicle speed. A measurement may come in at that next time step and the Kalman filter may determine how closely the predicted vehicle speed matches the vehicle speed that the measurement seems to indicate. The Kalman filter can use the difference between the predicted vehicle speed and the measured vehicle speed (i.e., the vehicle speed that the measurement seems to indicate) to update the uncertainty associated with the sensor. The larger the difference between the prediction and the actual state, the greater the uncertainty.

If the measurement includes a large amount of error, the difference between the prediction and the state the measurement seems to indicate will also be large and the updated uncertainty that the Kalman filter determines will also grow. This increase in uncertainty can destabilize the system and cause the estimated states output by the Kalman filter to be less accurate and/or precise. Bias in the measurement, introduced by skew in the sensor data (which may be introduced by drift in calibration or other natural causes in the sensor itself) may cause the system to be destabilized or destabilized sooner.

The techniques discussed herein include one or more neural networks that replace or augment portions of a Kalman filter to remedy various deficiencies of Kalman filters. For example, a Kalman filter may assume zero-mean Gaussian noise, both for the measurement and the motion model. This is unlikely to realistically be the case and may cause inaccuracy of the Kalman filter. Moreover, the measurement covariance is very difficult to determine for a single sensor and even more difficult when multiple sensors and multiple sensor types are involved, as in an autonomous vehicle system. Even if the noise profiles for different types of sensors was Gaussian, which is unlikely, the properties of the different types of noise experienced by those sensors would be completely different. Moreover, fusion of noise estimations is difficult, causing over- and under-segmentation of the sensor data.

The techniques include a reconfiguration of a Kalman filter that accounts for these unaddressed issues and maintains the human interpretability of the outputs of the intermediate components of the Kalman filter, which is not typical for neural network components. The techniques discussed herein may improve the accuracy and/or precision of a Kalman filter, protect accuracy of the Kalman filter from bias or errors in sensor output, and may improve the predictions of the Kalman filter. Additionally, the techniques may improve the safety and/or efficacy of an autonomous vehicle. For example, the techniques discussed herein may allow the autonomous vehicle to determine its own speed more accurately, track other objects more accurately (such as by determining a position and/or velocity of an object more accurately), and/or predict other objects' future actions more accurately (such as by predicting a future position and/or future velocity of an object more accurately).

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

In at least one example, a sensor may generate sensor data 106 in association with a time, which may be referred to herein as a time step a reference to a discrete point in time that is indexed by time steps. Sensor data may be generated at intervals between time steps, such as 5 milliseconds, 10 milliseconds, 20 milliseconds, 100 milliseconds, 250 milliseconds, 0.5 seconds, 1 second, 2 seconds, 5 seconds, or any other time interval. In some examples, the frequency of the time steps may be based at least in part on sensor output, a digital signal processing component, and/or a computing and/or time-keeping component of the vehicle 102. Each time step of sensor data may include a measurement that will depend on the sensor type. For example, radar, sonar, and/or lidar sensors may output a time between a signal emission and a return; an accelerometer may output a In some examples, the autonomous vehicle 102 may include computing device(s) 108 that may include a perception component 110 and/or a planning component 112, all or some of which may receive sensor data 106 from sensor(s) 104. The sensor(s) 104 may generate sensor data, which may be received by computing device(s) 108. However, in other examples, some or all of the sensor(s) 104 and/or computing device(s) 108 may be separate from and/or disposed remotely from the vehicle 102 and data capture, processing, commands, and/or controls may be communicated to/from the vehicle 102 by one or more remote computing devices via wired and/or wireless networks.

In general, the perception component 110 may determine what is in the environment surrounding the autonomous vehicle 102 and the planning component 112 may determine how to operate the autonomous vehicle 102 according to information received from the perception component 110 regarding the environment. The perception component 110 may include one or more ML models and/or other computer-executable instructions for detecting, identifying, segmenting, classifying, and/or tracking objects from sensor data collected from the environment of the autonomous vehicle 102.

Although a Kalman filter may be used in any of a number of different components of the autonomous vehicle in addition to or instead of the perception component 110 and/or the planning component 112, for the sake of brevity the function of two Kalman filters are discussed in regard to FIG. 1 as part of the perception component 110.

A first Kalman filter 114 may receive a first type of sensor data from the sensor(s) 104. For example, the first Kalman filter 114 may receive wheel encoder signals indicating a number of times that a motor associated with a wheel has rotated, a float value representing a torque from a torque sensor, or the like. Using the techniques discussed herein, the Kalman filter 114 may determine an estimated state 116 based on a measurement indicated in the sensor data. The particular Kalman filter 114 in this instance may determine a vehicle speed as the estimated state 116 using wheel encoder and/or torque sensor measurements. In other words, the measurement in such a case may be a number of times a wheel turned and the estimated state 116 may be a vehicle speed.

To give another example, a second Kalman filter 118 may receive a second type of sensor data from the sensor(s) 104. Such sensor data may include an image, lidar and/or radar data, or the like (i.e., raw sensor data), and/or perception data generation by the perception component, such as an object detection, region of interest (ROI) (e.g., a bounding box, a mask), semantic segmentation, instance segmentation, point cloud segmentation, and/or the like, as discussed in more detail in U.S. patent application Ser. No. 16/386,249, filed Apr. 16, 2019, the entirety of which is incorporated herein by reference for all purposes; and U.S. patent application Ser. No. 16/866,839, filed May 5, 2020, the entirety of which is incorporated herein by reference for all purposes. The Kalman filter 118 may use such data to determine an estimated state 120 that indicates a predicted position, heading, velocity, acceleration, or the like of a detected object, such as vehicle 122. In some examples, the prediction may be indicated in a sensor space (e.g., the estimated state may indicate an estimated position of an object within a camera frame) and/or the prediction may be indicated in coordinates associated with a representation of the real-world. In an additional or alternate example, the estimated state 120 determined by the Kalman filter 118 may indicate a current position, heading, velocity, acceleration, or the like of a detected object. Regardless, the current and/or predicted state associated with a detected object may be used by a tracking component 124 that creates, maintains, and/or retires tracks associated with objects.

The tracking component 124 may receive one or more environment representations and/or object detections from respective perception pipelines (e.g., vision pipeline, lidar pipeline, hybrid vision-lidar pipeline, radar pipeline, hybrid vision-lidar-radar pipeline, and/or the like) and determine whether or not to associate a formerly generated track with a current object detection or to generate a new track in association with a current object detection. The tracking component 124 may additionally or alternatively determine a final environment representation and/or an estimated object detection that may act as a summary of the different object detections. The tracking component 124 may use the estimated state 120 to determine whether or not to associate an object detection with a track. For example, the tracking component 124 may use the predicted position and/or heading and/or the Kalman filter's estimate of the current position of the detected object to determine whether such data corresponds with a track indicating previous positions, headings, etc. of a detected object. For example, the tracking component 124 may determine whether a previously predicted position/heading predicted by the Kalman filter 118 corresponds with a current position/heading output by the Kalman filter 118.

Ultimately, the tracking component 124 may output a track in association with a detected object, such as vehicle 122. In some examples, the track may associate a current object detection with one or more previous object detections and/or may indicate data related thereto, such as a velocity, acceleration, heading, object classification, unique identifier, occlusion status (e.g., whether the object is currently/previously occluded partially or totally from one or more sensors). In another example where the track is determined to be associated with an object that has newly been detected, the current object detection may be the only object detection associated with the track.

The planning component 112 may use the perception data received from perception component 110, such as estimated state 116, estimated state 120, and/or a track from the tracking component 124, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, 100 milliseconds, half a second, 6 seconds, any other number) to control the vehicle to traverse the route (e.g., in order to avoid any of the detected objects); and select one of the potential trajectories as a trajectory 126 that may be used to generate a drive control signal that may be transmitted to drive components of the vehicle 102. FIG. 1 depicts an example of such a trajectory 126, represented as an arrow indicating a heading, velocity, and/or acceleration, although the trajectory itself may comprise instructions for controller(s) of the vehicle 102, which may, in turn, actuate a drive system of the vehicle 102.

Example System

Figure 2:
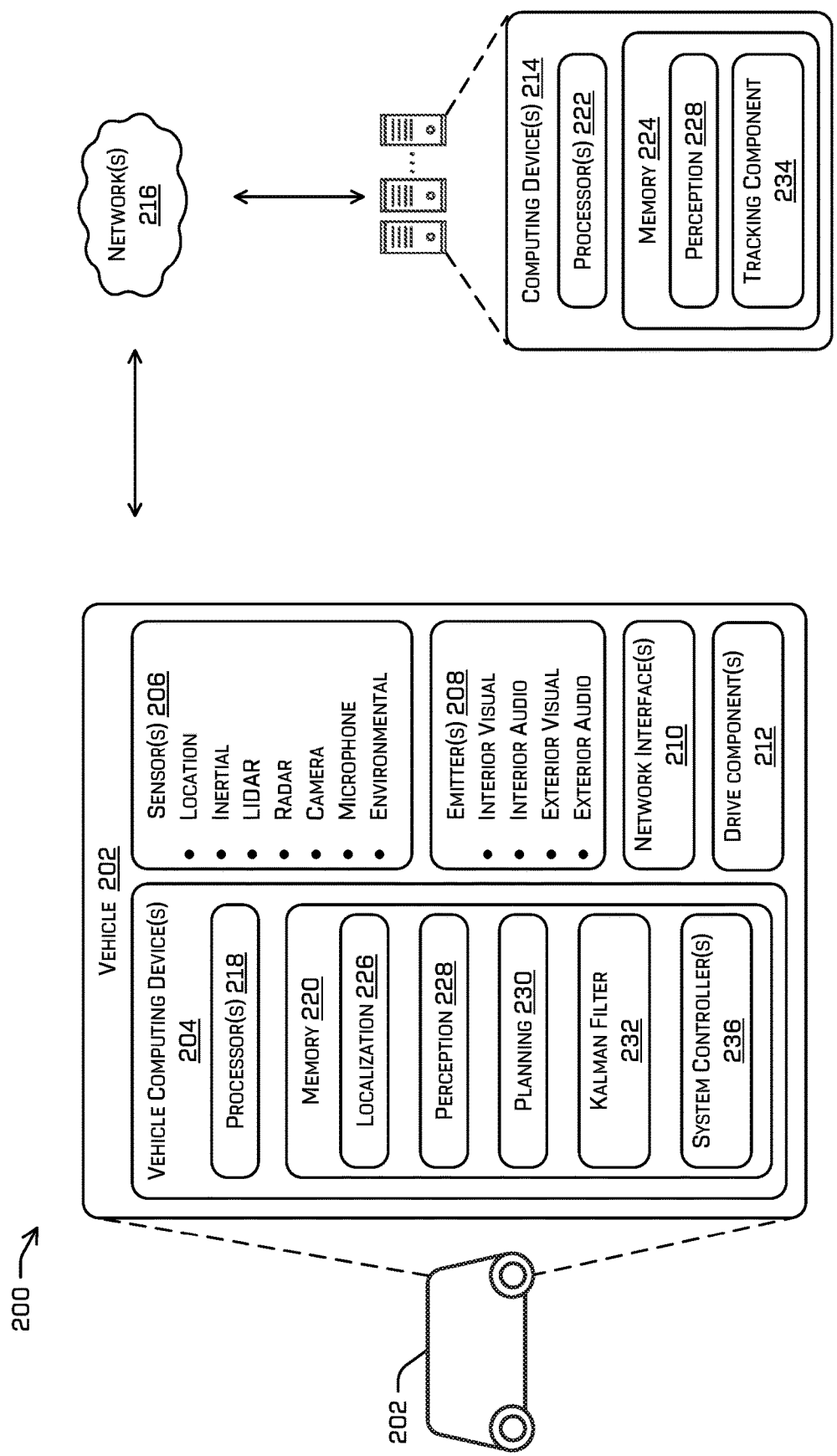
FIG. 2 illustrates a block diagram of an example system comprising a Kalman filter comprising the interpretable components that realize the improvements discussed herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 108 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, Kalman filter 232 and/or system controller(s) 236. Perception component 228 may represent perception component 110, planning component 230 may represent planning component 112, and/or Kalman filter 232 may represent Kalman filter 114 and/or 118. The memory 220 may additionally or alternatively comprise map(s), which are unillustrated.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the tracking component 234, a location and/or orientation of the vehicle 202 relative to the environment and/or sensor data associated therewith.

In some instances, perception component 228 may comprise a primary perception system and/or a prediction system implemented in hardware and/or software. The perception component 228 may comprise one or more perception pipelines that may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

Any of the components discussed, including any component associated with a sensor and/or that generates data based on a sensor, such as localization component 226, perception component 228, planning component 230, and/or system controller(s) 236 may comprise a Kalman filter 232 that functions as described herein. In some examples, the Kalman filter 232 may include a simple Kalman filter, a Kalman-Bucy filter, an extended Kalman filter (EKF), and/ or the like, including the additional and alternate components discussed herein. The Kalman filter 232 may be implemented in hardware, software, and/or a combination thereof (e.g., a field-programmable gate array (FPGA) or the like).

The memory 220 and/or 224 may additionally or alternatively store a mapping system (e.g., generating a map based at least in part on sensor data), a planning system, a ride management system, etc. Although localization component 226, perception component 228, planning component 230, Kalman filter 232, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, and/or other components of the system 200 may comprise one or more ML models. For example, the localization component 226, the perception component 228 and/or the planning component 230 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like or visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like. and the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

Figure 3A:
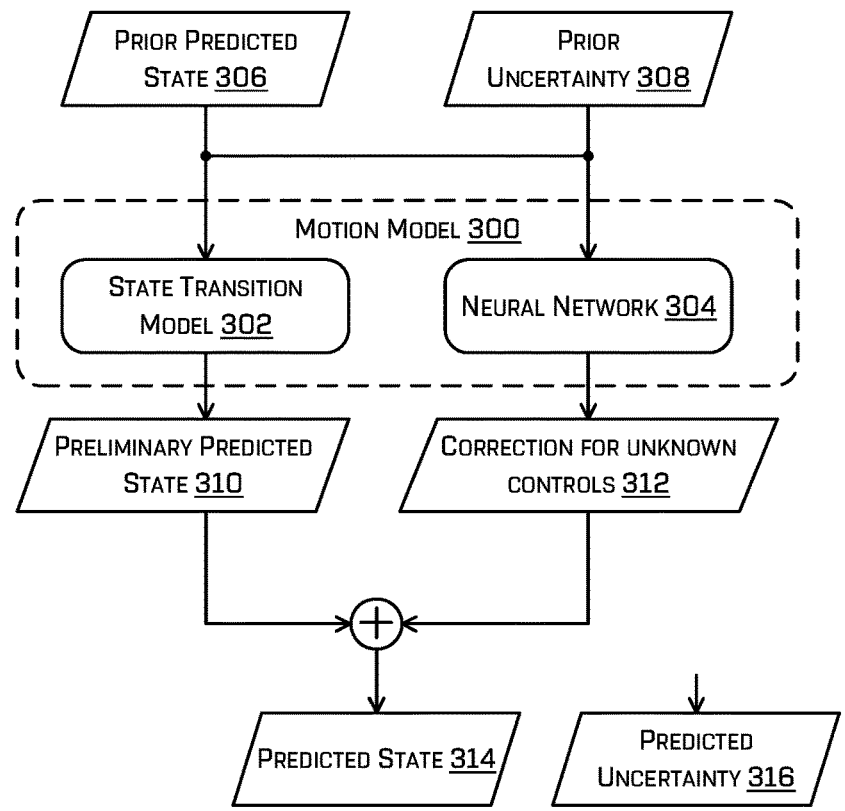
FIG. 3A illustrates a block diagram of a motion model of a Kalman filter where the motion model includes a state transition model and a neural network to account for unknown and/or undefined control signal(s) for an autonomous vehicle.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.
Example Kalman Filter Components FIG. 3A illustrates a block diagram of a motion model 300 of a Kalman filter where the motion model includes a state transition model 302 and a neural network 304 to account for unknown and/or undefined control signal(s) for an autonomous vehicle. The Kalman filter may comprise hardware and/or software for accomplishing a prediction operation and an update operation to ultimately determine an estimated state of a system or object. For example, the estimated state may indicate a state of a system, such as an autonomous vehicle's position, heading, speed, acceleration, or the like or an object's position, heading, speed, acceleration, and/or the like, the difference predominantly being what the Kalman filter is being used to estimate, as discussed above in reference to FIG. 1. In some examples, the estimated state ultimately output by the Kalman filter may indicate a current and/or future state of the system or object. Hereinafter, the discussion predominantly references a state of an object, although it is understood that, depending on where the Kalman filter is implemented in the computing device(s) of the autonomous vehicle, the Kalman filter may determine a state of a system of the autonomous vehicle itself, instead of an external object, such as for tracking vehicle 122 in the example given in FIG. 1.

Regardless, the motion model 300 may be implemented as hardware and/or software as part of a prediction operation of the Kalman filter. The Kalman filter may receive a prior predicted state 306, $\hat{x}_{k-1|k-1}$, and/or prior uncertainty 308, $P_{k-1|k-1}$. If this if the first time step, no such priors may exist, so an initialization state and/or initialization uncertainty may be used. Such initialization values may be based at least in part on the sensor data received from one or more sensors and/or stored values retrieved by the Kalman filter. In some examples, the prior predicted state (and/or the preliminary predicted state and/or predicted state) may include a matrix or tensor, meaning that the state may be multi-dimensional and/or multiple states may be determined. In an additional or alternate example, such as for estimating a state for a system of the vehicle the state may be a single value. In some examples, the uncertainty may be a single value or a matrix or tensor when the state is also a matrix or tensor. The uncertainty may include a covariance or field of covariances.

The motion model 300 may determine a preliminary predicted state 310, $x_{k|k-1}$, by the state transition model 302 according to:

$$\hat{x}_{k|k-1} = F_k \hat{x}_{k-1|k-1} + B_k U_k \tag{1}$$

where k is the k-th time tick, F is the state transition model 302, U is a control/input variable (if any, depending on what system is being monitored, and/or if any is available, which it may not be) (i.e., a measurable (deterministic) input to the system, such as steering commands, applied torque) B is a control/input transition matrix mapping control to state variables. In some examples, F, the state transition model 302, may be a model of a linear or nonlinear dynamic system, such as a transfer function. In other words, the Kalman filter uses a model of the system for which a state estimation is being generated to predict, using a previous state of the system and/or any controls provided to the system (if the system is a controlled system) to predict a next state of the system. This may be prediction of a next state of a system of the autonomous vehicle or a prediction of a next state of an object being tracked by the autonomous vehicle, for example.

However, in some examples, the controls, B, may be unavailable, corrupted (e.g., due to a software back, such as a stack overflow or the like), or the like. For example, the Kalman filter may exist at a point in the autonomous vehicle's computing pipeline where such controls have not yet been determined by the autonomous vehicle hardware and/or software. In such an instance, the motion model 300 may further comprise a neural network 304 that may be trained based at least in part on a data set that maps prior predicted states and/or prior uncertainties to the controls that the autonomous vehicle generated at the next time step. In other words, the neural network 304 may learn the controls that the vehicle is likely to determine/exert on the vehicle in response to the prior predicted state 306 and/or prior uncertainty 308. In some examples, the neural network 304 may additionally or alternatively receive a measurement as input, such as when the neural network 304 is not a recurrent neural network. In an additional or alternate example, the neural network 304 may be a recurrent neural network that learns (encodes) a correction 312 for such controls to the preliminary predicted state 310. In other words, the output of the neural network 304 may not be an indication of the controls themselves, but a delta (difference) between the controls and a preliminary predicted state output by the state transition model 302. Such a correction may have a same set of dimensions as the preliminary predicted state 310 (e.g., the correction may be multi-dimensional). In some examples, the neural network 304 may comprise a transformer or another self-attention model to further preserve the interpretability of the Kalman filter. For example, the transformer architecture may include a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR or the like Regardless, the correction 312 (or the indication of the controls output by the neural network 304) may be used to modify the preliminary predicted state 310. For example, the correction 312 may be summed to (or subtracted from) the preliminary predicted state 310 to determine a predicted state 314 output by the motion model 300, hereinafter referred to as $\hat{x}_{k|k-1}$.

In some examples, the Kalman filter may additionally or alternatively determine a measure of uncertainty associated with the predicted state 314, i.e., the predicted uncertainty 316, $P_{k|k-1}$, as part of the prediction operation. This measure of uncertainty may be a covariance matrix associated with the predict state given by:

$$P_{k|k-1} = F_k P_{k-1|k-1} F_k^T + Q_k \qquad (2)$$

where Q is a process noise matrix that may be independent or dependent on the state variables, depending on the type of system being monitored. Q may be given by $Q_k = E(w_k w_k^T)$ where E is the expected value and w is the process noise vector. The process noise matrix may, itself, include covariances associated with noise of the process.

Figure 3B:
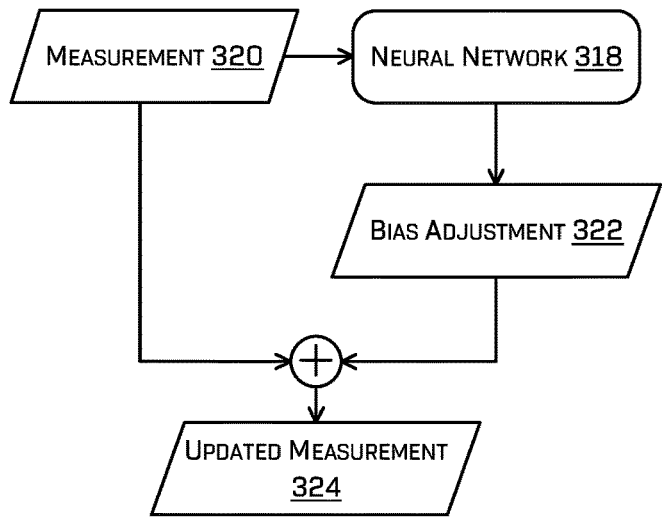
FIG. 3B illustrates a block diagram of a neural network included in a Kalman filter to alter a measurement to account for sensor bias.

FIG. 3B illustrates a block diagram of a neural network 318 included in a Kalman filter to alter a measurement to account for sensor bias. The Kalman filter may receive a measurement 320, z, from one or more sensors. This measurement may be provided to the neural network 318, which may be trained to output a bias adjustment 322 to account for a bias in the sensor data, which may be caused by noise, a flaw in a sensor, calibration drift, or the like. Training the neural network 318 may comprise at least two stages. The first stage may comprise training the first neural network using simulated sensor data that has zero bias or a first bias less than a threshold bias. In some examples, during this stage of the training the first neural network being trained to limit an output of the first neural network to zero or a value that is less than the threshold bias. For example, this limitation may include determining a loss based at least in part on any value that exceeds zero or the threshold bias that is output by the neural network 318. This loss may be used to alter the neural network 318 to minimize the loss.

During a second stage of the training, the neural network 318 may be trained using real-world sensor data and the limitation on the bias adjustment output by the neural network 318 may be relaxed (e.g., the threshold bias may be increased) or removed entirely. If a bias in the sensor data is known, as determined by other methods, this known bias may be used to determine a loss used to modify component(s) of the neural network 318 to drive the output of the neural network 318 towards the known bias. Additionally or alternatively, the bias need not be known for training the neural network. In such an example, an actual measurement may be determined, such as via a canonical source of truth or via a more accurate sensor (e.g., setting a sensor at a known distance from an object or other calibration-type methods). Training the neural network 318 in such an example may include determining a loss based at least in part on a difference between the measurement and the actual measurement and using that difference as part of the loss for modifying the neural network 318. In some examples, the difference may include a principle component analysis or other analysis means to determine a portion of the difference attributable to bias.

Regardless, once trained, the neural network may determine a bias adjustment 322 for a measurement received by the neural network 318 and pushed through the nodes of the neural network 318. This bias adjustment 322 may be used to determine an updated measurement 324, such as by summing the bias adjustment 322 and the measurement 320. Note that the measurement 320 and/or the bias adjustment 322 may be multi-dimensional matrices, tensors, vectors, or the like. In some examples, the neural network 318 may comprise a transformer or another self-attention model to further preserve the interpretability of the Kalman filter. In some examples, the measurement 320 may be accompanied by an indication of the sensor type and the neural network 318 may be a neural network trained for that sensor type (modality). In such an example, there may be different neural networks trained to handle different sensor types. This may help the neural network 318 accurately encode sensor accuracy drift that may occur over time, such as may be aggravated by environmental conditions such as extreme heat or cold or the like, between calibrations. Additionally, this may allow the sensor to be uncalibrated or to operate longer between calibrations.

Figure 4:
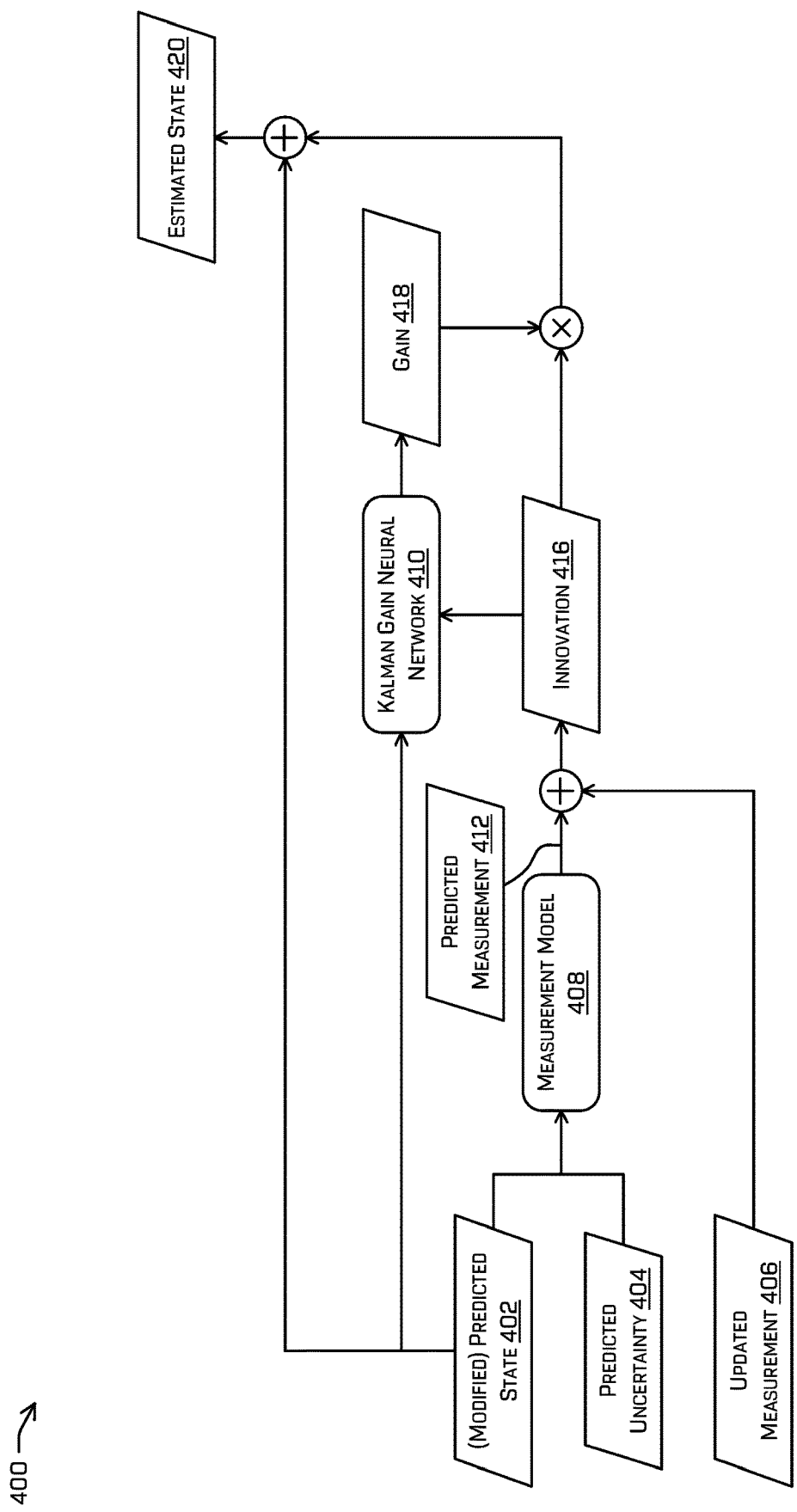
FIG. 4 illustrates a block diagram of a Kalman filter architecture modified according to the discussion herein.

FIG. 4 illustrates a block diagram of at least part of a Kalman filter 400 architecture modified according to the discussion herein. In some examples, the Kalman filter 400 may further include the state transition model 302, the motion model 300 that includes both the state transition model 302 and the neural network 304, and/or the neural network 318, or any combination thereof. For example, the Kalman filter 400 may receive a predicted state 402, which may be a modified predicted state, i.e., predicted state 314, as modified according to the discussion of FIG. 3A or a predicted state that is the preliminary predicted state 310 (in an example that doesn't include the neural network 304). The Kalman filter may additionally or alternatively receive a predicted uncertainty 404 associated with the predicted state 402, such as predicted uncertainty 316. The Kalman filter may additionally receive the measurement 320 or the updated measurement 324, although FIG. 4 depicts the latter example where the received uncertainty is an updated measurement 406, which may be the updated measurement 324.

The Kalman filter may additionally include a measurement model 408 and a Kalman gain neural network 410. In other words, the Kalman filter 400 architecture may include any of the following examples of combinations of components:

- State transition model 302, measurement model 408, and Kalman gain neural network 410;
- Motion model 300 (comprising state transition model 302 and neural network 304), measurement model 408, and Kalman gain neural network 410;
- State transition model 302, neural network 318, measurement model 408, and Kalman gain neural network 410; or
- Motion model 300 (comprising state transition model 302 and neural network 304), neural network 318, measurement model 408, and Kalman gain neural network 410.

In some examples, the measurement model 408 may receive the predicted state 402, whether the predicted state 314 or the preliminary predicted state 310 depending on the Kalman filter configuration, and/or the predicted uncertainty 404. The measurement model 408 (also called a state-observation emission model) may determine a predicted measurement 412, $\hat{y}_{t|t-1}$, based at least in part on the predicted state 402 and/or the predicted uncertainty 404. This determination of the predicted measurement 412 may be part of an prediction operation of the Kalman filter and may be given by:

$$\hat{y}_{k|k-1} = H \cdot \hat{x}_{k|k-1} \qquad (3)$$

where H is the transfer/emission function that composes the measurement model 408, also called an observation or observation matrix.

In some examples, the measurement model 408 may additionally or alternatively determine an innovation covariance, S, i.e., the pre-fit residual covariance, which may be given by:

$$S_k = H_k P_{k|k-1} H_k^T + R_k \quad (4)$$

where R is the measurement noise, which may be uncertainty associated with the sensor itself and may be given by $R_k = E(v_k v_k^T)$ wherein v is the measurement noise vector. In other words, this and the other prediction operations may be based on the known past estimation and the present estimation, and updating the uncertainty matrix to reflect how closely the prediction and the present estimation correspond.

In some examples, the predicted measurement 412 may be used to determine the innovation 416, $\Delta y_k$, which may indicate the difference between the predicted measurement 412 and the updated measurement 406. For example, the innovation may be given by:

$$\Delta y_k = y_k - H_k \hat{x}_{k|k-1} \quad (5)$$

The Kalman gain neural network 410 may comprise a neural network trained to determine a gain 418 (e.g., Kalman gain) based at least in part on the innovation 416 and/or the predicted state 402. In some examples, the Kalman gain neural network 410 may comprise a transformer or another self-attention model to further preserve the interpretability of the Kalman filter. In an additional or alternate example, the Kalman filter may additionally or alternatively determine an observation difference (e.g., $\Delta \hat{y}_k = y_k - y_{k-1}$), a forward transition difference (e.g., $\Delta \tilde{x}_k = \hat{x}_{k|k} - \hat{x}_{k-1|k-1}$) that indicates the difference between two consecutive posterior state estimates where for time step k the available feature is $\Delta \tilde{x}_{t-1}$, and/or the forward update difference (e.g., $\Delta \hat{x}_k = \hat{x}_{k|k} - x_{k|k-1}$) that indicates the difference between the posterior state estimate and the prior state estimate where for time step k the available feature is $\Delta \hat{x}_{k-1}$. In some examples, the Kalman gain neural network 410 may receive the observation difference, innovation difference, forward transition difference, and/or forward update difference as input. This allows the Kalman gain neural network 410 to predominantly be trained on the noise signature of the sensor(s) and thereby allows the gain 418 to decrease as the sensor reliability increases and vice versa. The gain 418 may be applied to the innovation 416 may multiplying the gain 418 with the innovation 416 and this product may be summed with the predicted state 402 to determine estimated state 420, which is the final predicted state associated with the system or object being tracked. For example, the estimated state may be given by:

$$\hat{x}_{k|k} = \hat{x}_{k|k-1} + K_k \Delta y_k \quad (6)$$

where $K_k$ is the gain 418 at time step k determined by the Kalman gain neural network 410. In some examples, the Kalman gain neural network 410, the neural network 304, and/or the fneural network 318 may comprise a transformer In some examples, the gain 418 may be weighted according to techniques discussed in U.S. patent application Ser. No. 17/508,811, filed Oct. 22, 2021, the entirety of which is incorporated by reference herein for all purposes.

In some examples, the gain 418 may additionally or alternatively be used to determine a measure of uncertainty of the estimation state. For example, the uncertainty associated with the estimated state 420 may be determined according to:

$$P_{k|k} = (I - K_k H_k) P_{k|k-1} (I - K_k H_k)^T + K_k R_k K_k \quad (7)$$

where I is the identity matrix and where $$P_{k|k-1} = F_k P_{k-1|k-1} F_k^T + Q_k = A_{k-1} A_{k-1}^T + Q_k \quad (8)$$

where $A_{k-1} = F_k L_{P_{k-1|k-1}}$ and $A_{k-1}^T = L_{P_{k-1|k-1}}^T F_k^T$ and L is a real lower triangular matrix with positive diagonal entries such that $P_{P_{k-1|k-1}} = L_{P_{k-1|k-1}} L_{P_{k-1|k-1}}^T$.

$$S_k = H_k P_{k|k-1} H_k^T + R_k = H L_{P_{k|k-1}} (H L_{P_{k|k-1}})^T + R_k \quad (9)$$

where L is a real lower triangular matrix with positive diagonal entries such that $P_{k|k-1} = L_{P_{k|k-1}} L_{P_{k|k-1}}^T$; and $$P_{k|k} = (I - K^*_k H_k) P_{k|k-1} (I - K^*_k H_k)^T + K^*_k R_k K^{*T}_k = (I - K^*_k H_k) L_{P_{k|k-1}} ((I - K^*_k H_k) L_{P_{k|k-1}})^T + K^*_k L_{R_k} (K^*_k L_{R_k})^T \quad (10)$$

where $R_k = L_{R_k} L_{R_k}^T$. Remember, too, that Q may be a process noise matrix that may be independent or dependent on the state variables, depending on the type of system being monitored, given by $Q_k = E(w_k w_k^T)$. In some examples, the squares in the above equation may be determined using a squared decomposition that may include a Cholesky decomposition, eigen decomposition, rank factorization, QR decomposition, LU decomposition, Jordan decomposition, and/or the like.

In the following figures, alternate configurations of the measurement model 408 and/or the Kalman gain neural network 410 are discussed. Either or both of the measurement model 408 and the Kalman gain neural network 410 may be modified as discussed below with reference to FIGS. 5A-5C.

Figure 5A:
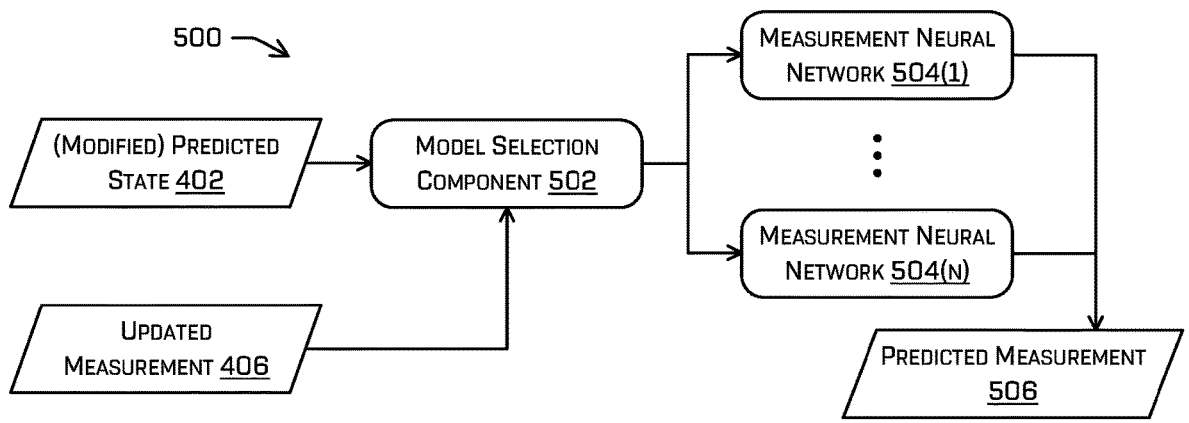
FIG. 5A illustrates a block diagram of an ensemble of neural networks included in a Kalman filter to determine a more accurate predicted measurement based at least in part on sensor type.

FIG. 5A illustrates a block diagram of an ensemble 500 of neural networks included in a Kalman filter to determine a more accurate predicted measurement based at least in part on sensor type. In particular, the ensemble 500 may replace the measurement model 408 in some examples, according to different example Kalman filter configurations discussed herein. The ensemble 500 architecture may include a model selection component 502 and measurement neural networks 504(1)-504(n), where n is a positive integer associated with a number of different sensor types available to the autonomous vehicle. In some examples, the model selection component 502 may receive the updated measurement 406, which may indicate a type of sensor with which the updated measurement 406 is associated. The measurement neural networks 504(1)-504(n) may each be trained on different sensor data and the model selection component 502 may determine one of the neural networks 504(1)-504(n), the m-th neural network 504(m) where m is a positive integer between 1 and n, to process the predicted state 402 based at least in part on the type of sensor indicated by the updated measurement 406 (and also associated with the predicted state 402. The determined neural network 504(m) may received the predicted state 402 as input and may be trained to determine a predicted measurement 506 based at least in part on the predicted state 402, thereby replacing the transfer function and increasing the ability to accurately model non-linear behavior. The predicted measurement 506 may also be associated with a particular sensor type (modality). Where multiple predicted states associated with different sensor modalities are received, multiple predicted measurements may be determined by the respective different measurement neural networks. In some examples, the measurement neural networks 504(1)-(n) may comprise different transformers or other self-attention neural networks.

Figure 5B:
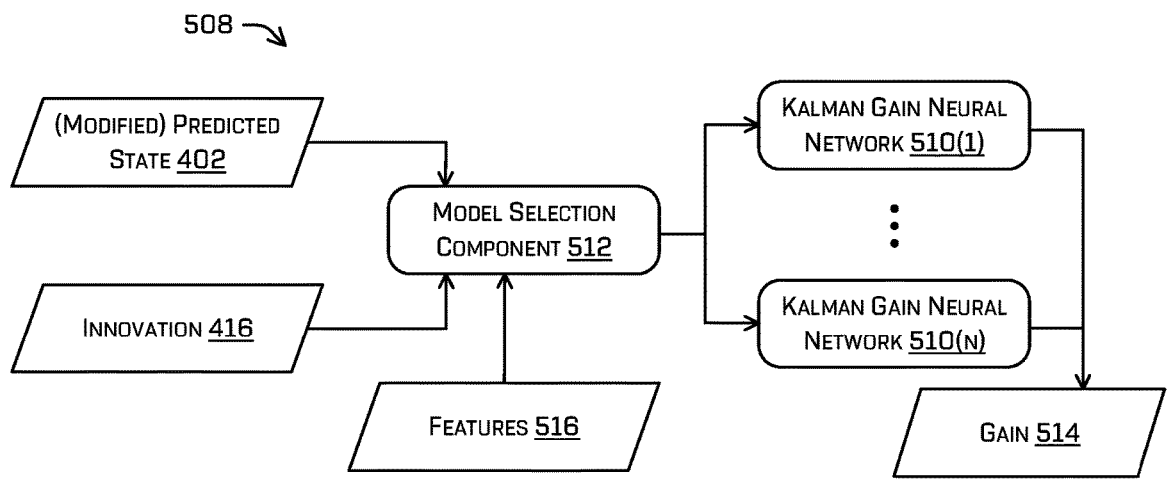
FIG. 5B illustrates a block diagram of an ensemble of neural network included in a Kalman filter to determine a more accurate gain based at least in part on sensor type.

If the Kalman filter 400 is configured to replace measurement model 408 with ensemble 500, the Kalman filter 400 may additionally be modified to replace the Kalman gain neural network 410 with an ensemble 508 of Kalman gain neural networks 510(1)-(n), as depicted in FIG. 5B. Similarly to the ensemble 500, ensemble 508 may include a model selection component 512 that determines one of the Kalman gain neural network models 510(1)-(n) based at least in part on a sensor data type associated with the predicted state 402 and/or innovation 416. The determined Kalman gain neural network 510(m) in such a configuration may be downstream from an associated measurement neural network 504(m) such that both the Kalman gain neural network 510(m) and associated measurement neural network 504(m) are associated with a same sensor type. Such a Kalman gain neural network 510(m) may receive feature(s) 516 associated with a same sensor type as the upstream measurement neural network 504(m). Such feature(s) 516 may include the innovation, observation difference, forward transition difference, and/or forward update difference as determined for that sensor type (and by the sensor-specific measurement neural network 504(m) where relevant). The Kalman gain network 510(m) may determine a gain 514 and/or covariance associated therewith determined based at least in part on the trained properties of the Kalman gain neural network 510(m). In some examples, where multiple gains are determined by different Kalman gain neural networks, the gains may be weighted based at least in part on their associated weights and summed to determine the final gain 514 output by ensemble 508 to replace gain 418. In some examples, the Kalman gain neural networks 510(1)-(n) may comprise different transformers or other self-attention neural networks.

Figure 5C:
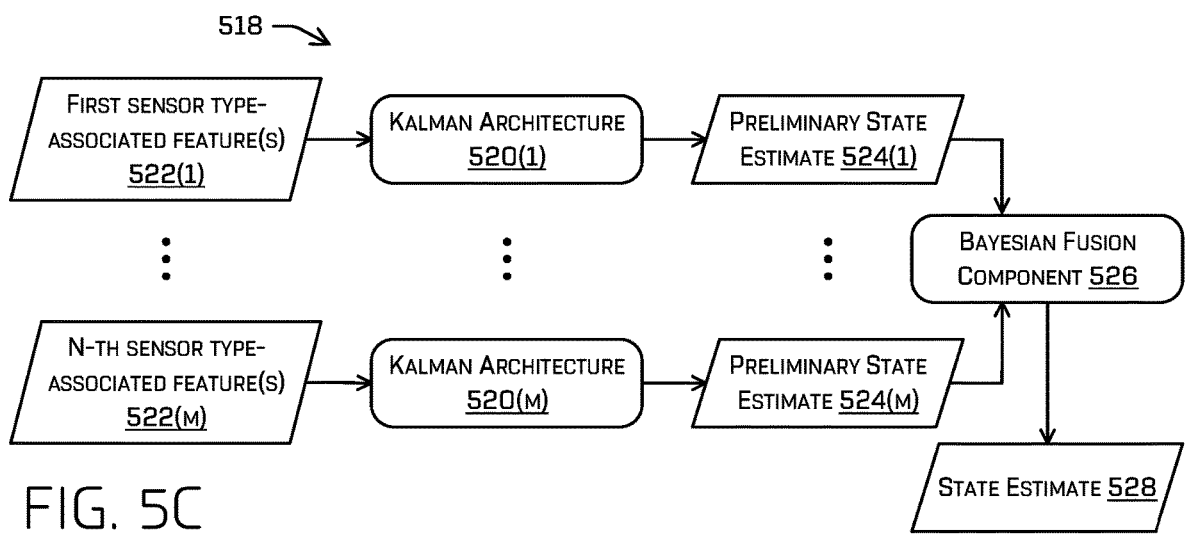
FIG. 5C illustrates a block diagram of a set of Kalman filter blocks that can each independently determine a state estimate and where the resultant state estimates may be fused to determine a more accurate state estimate.

FIG. 5C illustrates a block diagram 518 of an additional or alternate configuration where multiple Kalman architectures independently determine (preliminary) state estimates and these preliminary state estimates are fused as a final state estimate. In other words, a set of Kalman architectures 520(1)-(n) may each comprise components discussed above. For example, Kalman architecture 520(1) may comprise the Kalman filter architecture 400 and may optionally additionally include motion model 300 and/or neural network 318. This set 518 may be used in addition to or regardless of whether the measurement model 408 is modified according to the discussion associated with FIG. 5A. Each Kalman architecture 520 of the set 518 may be trained using data associated with different sensor types. For example, an m-th Kalman gain neural network 520(m) may be trained on an m-th type of sensor data (i.e., sensor data associated with an m-th sensor modality, such as one of camera sensor data, lidar data, radar data, or the like). In such an example, the m-th Kalman gain neural network 520(m) may receive feature(s) 522(m) associated with an m-th sensor type and may determine an m-th preliminary state estimate 524(m) and/or covariance based thereon. In such an example, the preliminary state estimate 524(m) may be determined in a same manner as the estimated state 420 according to the independent training of the m-th Kalman architecture, which may comprise architecture 400. In some examples, the feature(s) 522 may include the innovation, observation difference, forward transition difference, and/or forward update difference.

In an example where multiple preliminary state estimates 524 are determined by the respective Kalman architectures of the set 518, such preliminary state estimates 524(1)-(m) may be considered preliminary state estimates in that they may be fused to form a final state estimate. Each preliminary state estimate may be independently determined separate from the other preliminary state estimates. In some examples, a Bayesian fusion component 526 may determine a final state estimate 528 based at least in part on the preliminary state estimates 524(1)-(m) and their associated covariances. In some examples, the preliminary state estimates 524(1)-(m) may each include a mean, covariance, or Gaussian mixture. Determining the final state estimate 528 by the Bayesian fusion component 526 may comprise determining a covariance intersection of the preliminary state estimates 524(1)-(m) based at least in part on their associated respective covariance, and determining a fusion rule based at least in part on the covariance intersection. In an example where the preliminary state estimates 524(1)-(m) include Gaussian components, the Bayesian fusion component 526 may add the Gaussian components, renormalize, and then expand the tree to allow for a multi-hypothesis estimated state (e.g., multiple estimated states with potentially different likelihoods associated therewith). In such an example, a planning component or a further component of the Kalman filter may determine to prune or act on different ones of the estimates based at least in part on the Gaussian components.

In some examples, any of the disparate components discussed in FIGS. 5A-5C may be determined using distributed computing between multiple vehicles and/or edge computing devices. For example, a first computing resource (e.g., a vehicle, a remote computing device such as an edge computing device) may run measurement neural network 504(1) and/or Kalman gain neural network 510(1), an n-th computing resource may run measurement neural network 504(n) and/or Kalman gain neural network 510(n). A respective computing resource may transmit the output of the respective neural network to one or more computing resources and may receive outputs from the other computing resources such that one or more of the computing resources may determine the final gain 514 using all or less than all of the outputs. In another example, a first computing resource may run Kalman gain network 520(1) and an m-th computing resource may run Kalman gain network 520(m). Any of the computing resources that receive outputs from such networks from other computing resources may run the Bayesian fusion component 526 to determine the final state estimate 528.

Example Training

In some examples, training the Kalman filter described herein, in any of the combinations described, may be implemented without end-to-end training and may, instead, be conducted component-wise since the components are interpretable. In other words, a loss may be determined separately for each of the neural networks or ensembles. In an additional or alternate example, the Kalman filter may be trained end-to-end.

In some examples, the training may comprise a reinforcement learning-type strategy that batches the training data into different sets based on complexity. The training may progress by stages of increasing training data complexity. For example, a first training data batch may include sensor data and vehicle controls for short and straight trajectories, a second training data batch may include sensor data and vehicle controls for longer straight trajectories, a third training data batch may include sensor data and vehicle controls for a short trajectory that turns a little, a fourth training data batch may include sensor data and vehicle controls for a short trajectory that turns a little more, and so on. The training may also progress from a first meta-stage where the training data is simulated to a second meta-stage where the training data is real-life sensor data and/or controls, which may be labeled for ground truth. The simulated sensor data may allow some of the neural network components discussed herein to train on zero-mean Gaussian noise and become sensitive to deviations therefrom (non-zero mean, biased noise, non-Gaussian noise).

In some examples, the loss may be propagated through the whole Kalman filter. For example, the loss may be determined based at least in part on a root mean-squared error with a regularizing coefficient determined based at least in part on a difference between the estimated state 420 and an actual state, which may be derived from human or machine-labelled data. Additionally or alternatively, the root mean-squared error can be parameterized using sine/cosine and using a cosine similarity loss. Additionally or alternatively, the loss may comprise a weighted root mean-squared error, where the weights adjust the root mean-squared error such that neural network components of the Kalman filter are not altered until they output 0 error but error less than a threshold (tolerable) error. Regardless, the loss may be used to modify the neural network components to reduce the loss.

Example Process

Figure 6:
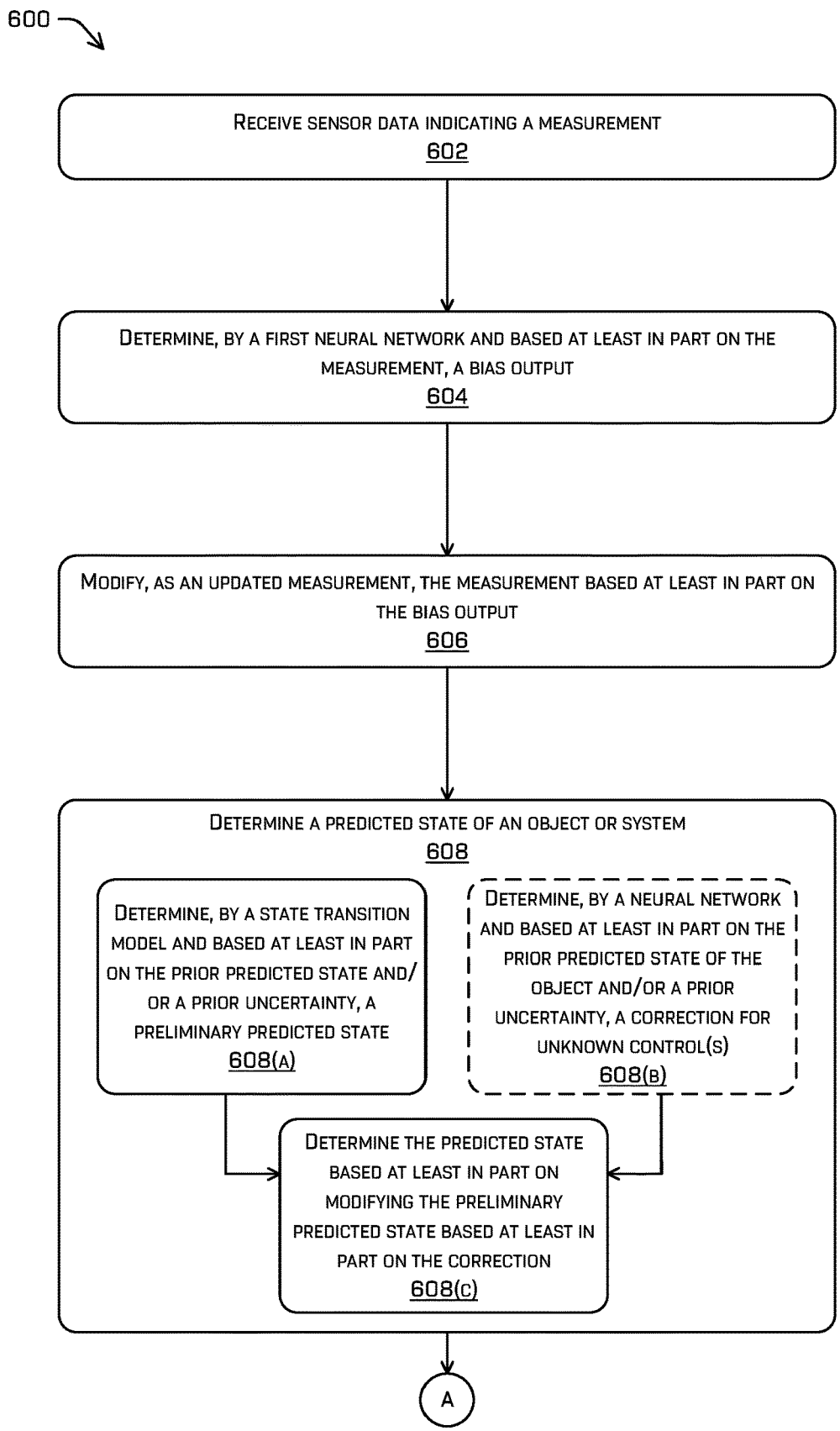
FIGS. 6 and 7 illustrate flow diagram of example processes for determining an estimated state using a Kalman filter comprising various neural network architectures.
Figure 7:
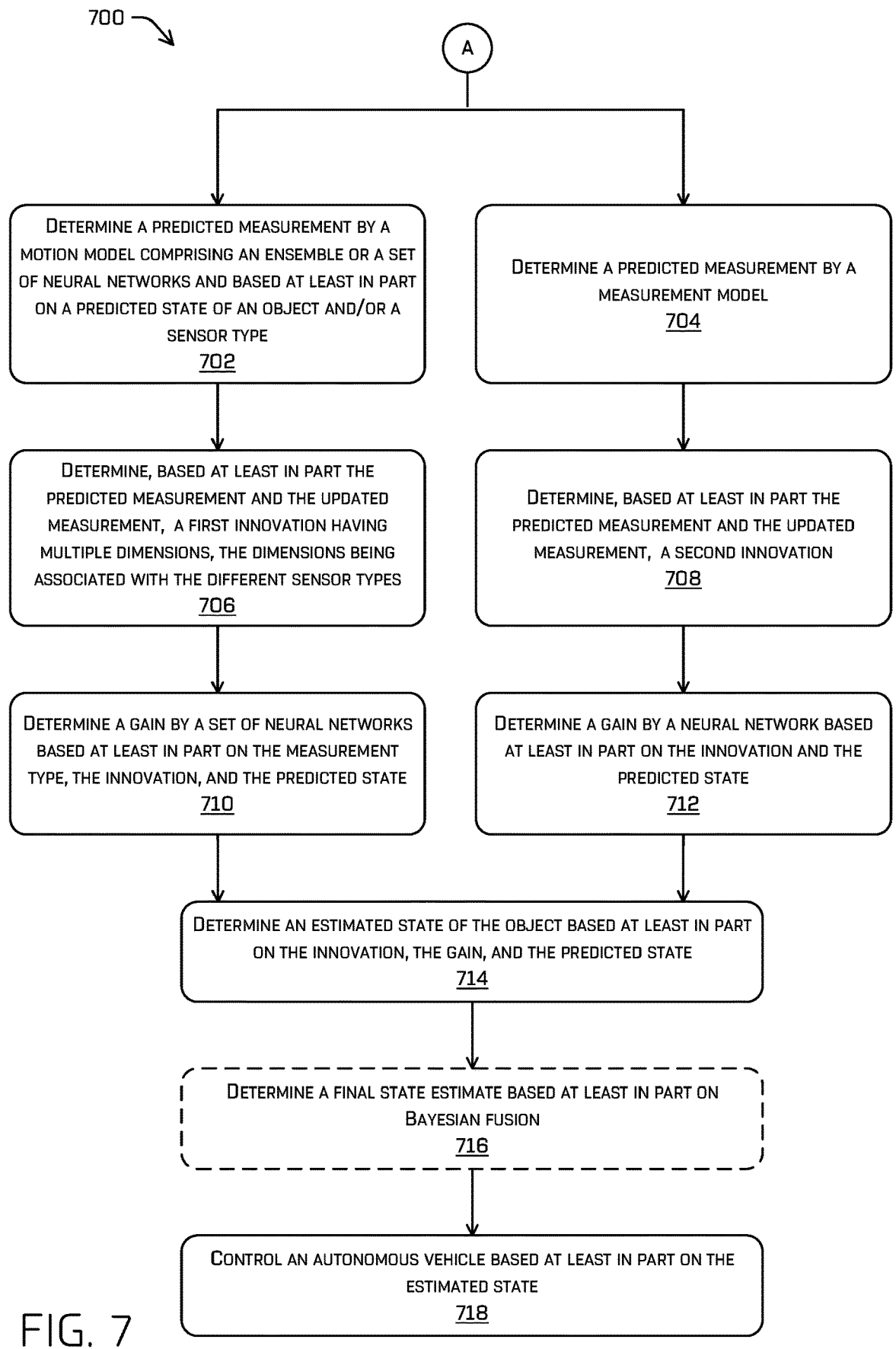

FIGS. 6 and 7 illustrate flow diagrams of example processes 600 and 700 for determining an estimated state associated with a system or object using a Kalman filter comprising various neural network architectures, as discussed herein. Depending on what the Kalman filter is being used for, various components of the autonomous vehicle may conduct example processes 600 and/or 700, such as the perception component, a tracking and/or prediction component of the perception component, a raw sensor data processor (e.g., a wheel encoder processor, a GPS processor), a planning component, a localization component, and/or the like.

At operation 602, example process 600 may comprise receiving sensor data indicating a measurement, according to any of the techniques discussed herein. As discussed above, the sensor data and measurement will depend on the component in which the Kalman filter is located. For example, the measurement may be a number of rotations of a motor or a wheel, three or four float values received from an accelerometer, perception data associated with an image and/or lidar data, etc.

At operation 604, example process 600 may comprise determining, by a first neural network and based at least in part on the measurement, a bias output, according to any of the techniques discussed herein. For example, operation 604 may be accomplished by neural network 318. Neural network 318 may be trained using different batches of training data of increasing complexity and/or in stages a first stage with simulated data that may be closer to zero-mean Gaussian noise and a second stage with real-life data that may have non-zero-mean and/or non-Gaussian noise.

At operation 606, example process 600 may comprise modifying, as an updated measurement, the measurement based at least in part on the bias output, according to any of the techniques discussed herein. This updated output may be determined based at least in part on summing the measurement and the bias adjustment determined by the neural network 318.

At operation 608, example process 600 may comprise determining a predicted state of a system or object, according to any of the techniques discussed herein. In some examples, operation 608 may at least comprise operation 608(*a*). In some examples, the Kalman filter may additionally include neural network 304 and, in such an example, operation 608 may additionally include operations 608(*b*) and 608(*c*).

At operation 608(*a*), example process 600 may comprise determining, by state transition model and based at least in part on the prior predicted state and/or prior uncertainty, a preliminary predicted state, according to any of the techniques discussed herein. In some examples, operation 608(*a*) may be conducted by a transfer function modelling the object or system's dynamics.

At operation 608(*b*), example process 600 may comprise determining, by a neural network and based at least in part on the prior predicted state of the object and/or a prior uncertainty, a correction for unknown control(s), according to any of the techniques discussed herein. In some examples, neural network 304 may execute operation 608(*b*).

At operation 608(*c*), example process 600 may comprise determining the predicted state based at least in part on modifying the preliminary predicted state based at least in part on the correction output by the neural network at operation 608(*b*), according to any of the techniques discussed herein. In some examples, operation 608(*c*) may include summing or multiplying the preliminary predicted state and the correction.

Turning to FIG. 7, example process 700 may comprise operation 702 or operation 704, according to any of the techniques discussed herein. Operation 704 includes using an observation emission function (e.g., measurement model 408) to determine a predicted measurement, whereas operation 702 includes using one or more neural networks to determine the predicted measurement.

At operation 702, example process 700 may comprise determining a predicted measurement by a measurement model comprising one or more neural networks and based at least in part on a predicted state of an object and/or a sensor type associated with the measurement and/or predicted state, according to any of the techniques discussed herein. For example, operation 702 may include using the neural network(s) described in reference to FIG. 5A to determine a predicted measurement, such as predicted measurement 506.

At operation 704, example process 700 may comprise determining a predicted measurement by a measurement, such as an observation emission function, according to any of the techniques discussed herein. For example, the observation emission function may be a nominal Kalman filter measurement model.

At operation 706, example process 700 may comprise determining, based at least in part on the predicted measurement and the updated measurement 406, a first innovation having multiple dimensions, the dimensions being associated with different sensor types, according to any of the techniques discussed herein. For example, there may be different predicted measurements determined by the neural networks described in reference to FIG. 5A and each of these may be used based at least in part on the updated measurement 406 to determine a different innovation. These different innovations may be concatenated together and an indicator may encode the sensor type associated with each innovation. In an additional or alternate example, the different innovations may be concatenated together and no indication of sensor type may be encode and/or in another example, the different innovations may separately be provided to the Kalman gain neural network 410.

At operation 708, example process 700 may comprise determining, based at least in part on the predicted measurement 412 and the updated measurement 406, a second innovation, according to any of the techniques discussed herein.

At operation 710, example process 700 may comprise determining a gain by a set of neural networks based at least in part on the measurement type (i.e., the associated sensor data type), the innovation, and the predicted state, according to any of the techniques discussed herein. For example, operation 710 may be accomplished by a set of neural networks as described in reference to FIG. 5B. A respective neural network may be determined to process the features based at least in part on a sensor data type associated with the measurement. For example, the features may include the innovation, the predicted state, and/or other variables that may be based thereon such as an observation difference, a forward transition difference, and/or the forward update difference.

At operation 712, example process 700 may comprise determining a gain by a neural network based at least in part on the innovation and the predicted state, according to any of the techniques discussed herein. For example, the neural network may include Kalman gain neural network 410. In some examples, determining the gain may be additionally or alternatively based at least in part on an observation difference, a forward transition difference, and/or the forward update difference.

At operation 714, example process 700 may comprise determining an estimated state (and/or uncertainty associated therewith) of the system/object based at least in part on the innovation, the gain, and the predicted state, according to any of the techniques discussed herein.

For an example implementing a set of Kalman architectures as discussed with reference to FIG. 5C, example process 700 may comprise executing operations 702, 706, 710, and 714 or operations 704, 708, and 712 independently by different neural networks/transformers. In such an instance, example process 700 may further include operation 716. In an instance where multiple Kalman architectures aren't used, operation 716 may be omitted.

At operation 718, example process 700 may comprise controlling an autonomous vehicle based at least in part on the estimated state and/or the uncertainty, according to any of the techniques discussed herein. For example, the localization component may use an estimated state indicating an estimated vehicle speed to determine where the vehicle is in an environment, the planning component may use a vehicle speed and/or tracks associated with detected objects to plan a route and/or generate a trajectory for controlling the vehicle, etc.

Example Clauses

A. A method comprising: receiving sensor data indicating a measurement associated with an object; determining, by a first neural network and based at least in part on the measurement, a bias output indicating a bias associated with the sensor data; modifying the measurement, as an updated measurement, based at least in part on the bias output; determining, by a motion model and based at least in part on a prior predicted state, a predicted state associated with the object; determining, by a measurement model based at least in part on the prior predicted state, a predicted measurement; determining, as part of an update operation by a Kalman filter, a first difference between the updated measurement and the predicted measurement and a second difference between the prior predicted state and the predicted state; determining, by a second neural network and based at least in part on the first difference and the second difference, a gain; determining, based at least in part on the first difference, the gain, and the predicted state, an estimated state associated with the object, the estimated state being associated with a future time; and controlling an autonomous vehicle based at least in part on the estimated state.

B. The method of paragraph A, wherein the second neural network comprises at least one of a transformer or self-attention network.

C. The method of either paragraph A or B, wherein determining the predicted state further comprises: determining, by a state transition model based at least in part on the prior predicted state, a preliminary predicted state; determining, by a third neural network and based at least in part on the prior predicted state, a correction associated with an undefined control parameter for controlling the autonomous vehicle; and determining the predicted state by modifying the preliminary predicted state based at least in part on the correction.

D. The method of any one of paragraphs A-C, wherein: the measurement model comprises an ensemble of sub-neural networks associated with different sensor types; and determining the predicted measurement further comprises determining the predicted measurement by a first sub-neural network that is trained based at least in part on a first sensor type associated with both the sensor data and the first sub-neural network.

E. The method of paragraph D, wherein: the second neural network comprises a second ensemble of sub-neural networks; and determining the gain is further based at least in part on determining the gain by one of the sub-neural networks from among the second ensemble of sub-neural networks based at least in part on the sensor type associated with the sensor data.

F. The method of any one of paragraphs A-E, wherein: the estimated state is a first estimated state; the first neural network, the motion model, the measurement model, and the second neural network are part of a first Kalman architecture; the sensor data is first sensor data associated with a first sensor modality and the first Kalman architecture; the method further comprises: determining, by a second Kalman architecture, a second estimated state based at least in part on second sensor data associated with a second sensor modality different than the first sensor modality, the second Kalman architecture being associated with the second sensor modality; and determining a final estimated state based at least in part on determining a Bayesian fusion of the first estimated state and the second estimated state; and controlling the autonomous vehicle is based at least in part on the final estimated state.

G. A system comprising: one or more processors; and a memory storing processor-executable instructions that, when executed by the one or more processors, cause the system to perform operations comprising: receiving sensor data indicating a measurement; determining, by a first neural network and based at least in part on the measurement, a bias output; modifying the measurement, as an updated measurement, based at least in part on the bias output; determining, by a motion model and based at least in part on a prior predicted state, a predicted state associated with an object; determining, by a measurement model based at least in part on the prior predicted state, a predicted measurement; determining a first difference between the updated measurement and the predicted measurement and a second difference between the prior predicted state and the predicted state; determining, by a second neural network and based at least in part on the first difference and the second difference, a gain; determining, based at least in part on the first difference, the gain, and the predicted state, an estimated state associated with the object; and controlling an autonomous vehicle based at least in part on the estimated state.

H. The system of paragraph G, wherein the second neural network comprises at least one of a transformer or self-attention network.

I. The system of either paragraph G or H, wherein determining the predicted state further comprises: determining, by a state transition model based at least in part on the prior predicted state, a preliminary predicted state; determining, by a third neural network and based at least in part on the prior predicted state, a correction associated with an undefined control parameter for controlling the autonomous vehicle; and determining the predicted state by modifying the preliminary predicted state based at least in part on the correction.

J. The system of any one of paragraphs G-I, wherein: the measurement model comprises an ensemble of sub-neural networks associated with different sensor types; and determining the predicted measurement further comprises determining the predicted measurement by a first sub-neural network that is trained based at least in part on a first sensor type associated with both the sensor data and the first sub-neural network.

K. The system of paragraph J, wherein the first sub-neural network comprises a transformer.

L. The system of either paragraph J or K, wherein: the second neural network comprises a second ensemble of sub-neural networks; and determining the gain is further based at least in part on determining the gain by one of the sub-neural networks from among the second ensemble of sub-neural networks based at least in part on the sensor type associated with the sensor data.

M. The system of any one of paragraphs G-L, wherein: the estimated state is a first estimated state; the first neural network, the motion model, the measurement model, and the second neural network are part of a first Kalman architecture; the sensor data is first sensor data associated with a first sensor modality and the first Kalman architecture; the method further comprises: determining, by a second Kalman architecture, a second estimated state based at least in part on second sensor data associated with a second sensor modality different than the first sensor modality, the second Kalman architecture being associated with the second sensor modality; and determining a final estimated state based at least in part on determining a Bayesian fusion of the first estimated state and the second estimated state; and controlling the autonomous vehicle is based at least in part on the final estimated state.

N. The system of any one of paragraphs G-M, wherein training the first neural network comprises: a first stage comprising training the first neural network using simulated sensor data that has zero bias or a first bias less than a threshold bias, the first neural network being trained to limit an output of the first neural network to zero or a value that is less than the threshold bias; and a second stage comprising training the first neural network using real-world sensor data and removing the output limit enforced during the first stage.

O. A non-transitory computer-readable medium storing processor-executable instructions that, when executed by one or more processors, cause the one or more processors to perform operations comprising: receiving sensor data indicating a first measurement; determining a difference between the first measurement and a predicted measurement; determining a weight based at least in part on the difference; modifying a Kalman filter based at least in part on the weight; determining, by the Kalman filter and based at least in part on the modification and the first measurement, an estimated state; and controlling an autonomous vehicle based at least in part on the estimated state.

P. The non-transitory computer-readable medium of paragraph O, wherein the second neural network comprises at least one of a transformer or self-attention network.

Q. The non-transitory computer-readable medium of either paragraph O or P, wherein determining the predicted state further comprises: determining, by a state transition model based at least in part on the prior predicted state, a preliminary predicted state; determining, by a third neural network and based at least in part on the prior predicted state, a correction associated with an undefined control parameter for controlling the autonomous vehicle; and determining the predicted state by modifying the preliminary predicted state based at least in part on the correction.

R. The non-transitory computer-readable medium of any one of paragraphs O-Q, wherein: the measurement model comprises an ensemble of sub-neural networks associated with different sensor types; and determining the predicted measurement further comprises determining the predicted measurement by a first sub-neural network that is trained based at least in part on a first sensor type associated with both the sensor data and the first sub-neural network.

S. The non-transitory computer-readable medium of any one of paragraphs O-R, wherein: the estimated state is a first estimated state; the first neural network, the motion model, the measurement model, and the second neural network are part of a first Kalman architecture; the sensor data is first sensor data associated with a first sensor modality and the first Kalman architecture; the method further comprises: determining, by a second Kalman architecture, a second estimated state based at least in part on second sensor data associated with a second sensor modality different than the first sensor modality, the second Kalman architecture being associated with the second sensor modality; and determining a final estimated state based at least in part on determining a Bayesian fusion of the first estimated state and the second estimated state; and controlling the autonomous vehicle is based at least in part on the final estimated state.

T. The non-transitory computer-readable medium of any one of paragraphs O-S, wherein training the first neural network comprises: a first stage comprising training the first neural network using simulated sensor data that has zero bias or a first bias less than a threshold bias, the first neural network being trained to limit an output of the first neural network to zero or a value that is less than the threshold bias; and a second stage comprising training the first neural network using real-world sensor data and removing the output limit enforced during the first stage.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data indicating a measurement associated with an object;
   determining, by a first neural network and based at least in part on the measurement, a bias output indicating a bias associated with the sensor data, the first neural network being trained under at least a first stage and a second stage, wherein:
      the first stage comprises training the first neural network using simulated sensor data that has zero bias or a first bias less than a threshold bias, the first neural network being trained to limit an output of the first neural network to zero or a value that is less than the threshold bias; and
      the second stage comprising training the first neural network using real-world sensor data and removing an output limit enforced during the first stage;
   modifying the measurement, as an updated measurement, based at least in part on the bias output;
   determining, by a motion model and based at least in part on a prior predicted state, a predicted state associated with the object;
   determining, by a measurement model based at least in part on the prior predicted state, a predicted measurement;
   determining, as part of an update operation by a Kalman filter, a first difference between the updated measurement and the predicted measurement and a second difference between the prior predicted state and the predicted state associated with the object;
   determining, by a second neural network and based at least in part on the first difference and the second difference, a gain;
   determining, based at least in part on the first difference, the gain, and the predicted state associated with the object, an estimated state associated with the object, the estimated state being associated with a future time; and
   controlling an autonomous vehicle based at least in part on the estimated state.

2. The method of claim 1, wherein the second neural network comprises at least one of a transformer or a self-attention network.

3. The method of claim 1, wherein determining the predicted state associated with the object further comprises:
   determining, by a state transition model based at least in part on the prior predicted state, a preliminary predicted state;
   determining, by a third neural network and based at least in part on the prior predicted state, a correction associated with an undefined control parameter for controlling the autonomous vehicle; and
   determining the predicted state associated with the object by modifying the preliminary predicted state based at least in part on the correction.

4. The method of claim 1, wherein:
   the measurement model comprises an ensemble of sub-neural networks associated with different sensor types; and determining the predicted measurement further comprises determining the predicted measurement by a first sub-neural network that is trained based at least in part on a first sensor type associated with both the sensor data and the first sub-neural network.

5. The method of claim 4, wherein:
the second neural network comprises a second ensemble of sub-neural networks; and determining the gain is further based at least in part on determining the gain by a second sub-neural network from among the second ensemble of sub-neural networks based at least in part on the sensor type associated with the sensor data.

6. The method of claim 1, wherein:
the estimated state is a first estimated state;
the first neural network, the motion model, the measurement model, and the second neural network are part of a first Kalman architecture;
the sensor data is first sensor data associated with a first sensor modality and the first Kalman architecture;
the method further comprises:
determining, by a second Kalman architecture, a second estimated state based at least in part on second sensor data associated with a second sensor modality different than the first sensor modality, the second Kalman architecture being associated with the second sensor modality; and
determining a final estimated state based at least in part on determining a Bayesian fusion of the first estimated state and the second estimated state; and
controlling the autonomous vehicle is based at least in part on the final estimated state.

7. A system comprising:
one or more processors; and
a memory storing processor-executable instructions that, when executed by the one or more processors, cause the system to perform operations comprising:
receiving sensor data indicating a measurement;
determining, by a first neural network and based at least in part on the measurement, a bias output, the first neural network being trained under at least a first stage and a second stage, wherein:
the first stage comprises training the first neural network using simulated sensor data that has zero bias or a first bias less than a threshold bias, the first neural network being trained to limit an output of the first neural network to zero or a value that is less than the threshold bias, and
the second stage comprises training the first neural network using real-world sensor data and removing an output limit enforced during the first stage;
modifying the measurement, as an updated measurement, based at least in part on the bias output;
determining, by a motion model and based at least in part on a prior predicted state, a predicted state associated with an object;
determining, by a measurement model based at least in part on the prior predicted state, a predicted measurement;
determining a first difference between the updated measurement and the predicted measurement and a second difference between the prior predicted state and the predicted state associated with the object;
determining, by a second neural network and based at least in part on the first difference and the second difference, a gain;
determining, based at least in part on the first difference, the gain, and the predicted state associated with the object, an estimated state associated with the object; and
controlling an autonomous vehicle based at least in part on the estimated state.

8. The system of claim 7, wherein the second neural network comprises at least one of a transformer or a self-attention network.

9. The system of claim 7, wherein determining the predicted state associated with the object further comprises:
determining, by a state transition model based at least in part on the prior predicted state, a preliminary predicted state;
determining, by a third neural network and based at least in part on the prior predicted state, a correction associated with an undefined control parameter for controlling the autonomous vehicle; and
determining the predicted state associated with the object by modifying the preliminary predicted state based at least in part on the correction.

10. The system of claim 7, wherein:
the measurement model comprises an ensemble of sub-neural networks associated with different sensor types; and
determining the predicted measurement further comprises determining the predicted measurement by a first sub-neural network that is trained based at least in part on a first sensor type associated with both the sensor data and the first sub-neural network.

11. The system of claim 10, wherein the first sub-neural network comprises a transformer.

12. The system of claim 10, wherein:
the second neural network comprises a second ensemble of sub-neural networks; and determining the gain is further based at least in part on determining the gain by a second sub-neural network from among the second ensemble of sub-neural networks based at least in part on the sensor type associated with the sensor data.

13. The system of claim 7, wherein:
the estimated state is a first estimated state;
the first neural network, the motion model, the measurement model, and the second neural network are part of a first Kalman architecture;
the sensor data is first sensor data associated with a first sensor modality and the first Kalman architecture;
the operations further comprise:
determining, by a second Kalman architecture, a second estimated state based at least in part on second sensor data associated with a second sensor modality different than the first sensor modality, the second Kalman architecture being associated with the second sensor modality; and
determining a final estimated state based at least in part on determining a Bayesian fusion of the first estimated state and the second estimated state; and
controlling the autonomous vehicle is based at least in part on the final estimated state.

14. A non-transitory computer-readable medium storing processor-executable instructions that, when executed by one or more processors, cause the one or more processors to perform operations comprising:
receiving sensor data indicating a measurement;
determining, by a first neural network of a Kalman filter and based at least in part on the measurement, a bias output, the first neural network being trained under at least a first stage and a second stage, wherein:

the first stage comprises training the first neural network using simulated sensor data that has zero bias or a first bias less than a threshold bias, the first neural network being trained to limit an output of the first neural network to zero or a value that is less than the threshold bias; and the second stage comprises training the first neural network using real-world sensor data and removing an output limit enforced during the first stage;

modifying the measurement, as an updated measurement, based at least in part on the bias output;

determining, by a motion model of the Kalman filter and based at least in part on a prior predicted state, a predicted state associated with an object;

determining, by a measurement model of the Kalman filter based at least in part on the prior predicted state, a predicted measurement;

determining a first difference between the updated measurement and the predicted measurement and a second difference between the prior predicted state and the predicted state associated with the object;

determining, by a second neural network of the Kalman filter and based at least in part on the first difference and the second difference, a gain;

determining, based at least in part on the first difference, the gain, and the predicted state associated with the object, an estimated state; and controlling an autonomous vehicle based at least in part on the estimated state.

15. The non-transitory computer-readable medium of claim 14, wherein the second neural network comprises at least one of a transformer or a self-attention network.

16. The non-transitory computer-readable medium of claim 14, wherein determining the predicted state associated with the object further comprises:

determining, by a state transition model based at least in part on the prior predicted state, a preliminary predicted state;

determining, by a third neural network and based at least in part on the prior predicted state, a correction associated with an undefined control parameter for controlling the autonomous vehicle; and determining the predicted state associated with the object by modifying the preliminary predicted state based at least in part on the correction.

17. The non-transitory computer-readable medium of claim 14, wherein:

the measurement model comprises an ensemble of sub-neural networks associated with different sensor types; and determining the predicted measurement further comprises determining the predicted measurement by a first sub-neural network that is trained based at least in part on a first sensor type associated with both the sensor data and the first sub-neural network.

18. The non-transitory computer-readable medium of claim 14, wherein:

the estimated state is a first estimated state;

the first neural network, the motion model, the measurement model, and the second neural network are part of a first Kalman architecture;

the sensor data is first sensor data associated with a first sensor modality and the first Kalman architecture;

the operations further comprise:

determining, by a second Kalman architecture, a second estimated state based at least in part on second sensor data associated with a second sensor modality different than the first sensor modality, the second Kalman architecture being associated with the second sensor modality; and determining a final estimated state based at least in part on determining a Bayesian fusion of the first estimated state and the second estimated state; and controlling the autonomous vehicle is based at least in part on the final estimated state.

* * * * *